United States Patent [19]

Baeling et al.

[11] Patent Number: 4,552,775
[45] Date of Patent: Nov. 12, 1985

[54] PROCESS FOR THE PRODUCTION OF ANIMAL FEED STUFF FROM A LIQUID RESIDUE OBTAINED BY FERMENTATION AND DISTILLATION OF GRAIN RAW MATERIAL

[75] Inventors: Peter Baeling, Ekero; Lars Ehnstrom, Tullinge, both of Sweden

[73] Assignees: Alfa-Laval AB; Svenska Lantmännens Riksförbund, Förening u.p.a, both of Sweden; by said Lars Ehnstrom

[21] Appl. No.: 474,635
[22] PCT Filed: Jun. 7, 1982
[86] PCT No.: PCT/SE82/00199
  § 371 Date: Feb. 28, 1983
  § 102(e) Date: Feb. 28, 1983
[87] PCT Pub. No.: WO83/00007
  PCT Pub. Date: Jan. 6, 1983
[51] Int. Cl.⁴ ............................................. A23K 1/00
[52] U.S. Cl. .................................. 426/624; 426/471; 426/630; 426/807
[58] Field of Search ............... 426/624, 623, 630, 471, 426/807; 55/302; 159/48.1

[56] References Cited

U.S. PATENT DOCUMENTS

| | | |
|---|---|---|
| 312,593 | 2/1885 | Wiesebroek .......................... 426/624 |
| 821,326 | 5/1906 | Ahlers .................................. 426/624 |
| 1,057,142 | 3/1913 | Geiger ................................. 426/624 |
| 2,214,909 | 9/1940 | Pittman et al. ...................... 426/624 |
| 2,225,428 | 12/1940 | Christensen ......................... 426/624 |
| 2,263,608 | 11/1941 | Brown .................................. 426/624 |
| 3,880,968 | 4/1975 | Kaspar et al. ....................... 55/302 X |
| 4,040,190 | 8/1977 | van den Broek ...................... 34/60 |
| 4,370,198 | 1/1983 | Denes et al. ......................... 159/48.1 |

FOREIGN PATENT DOCUMENTS

| | | | |
|---|---|---|---|
| WO83/00006 | 1/1983 | PCT Int'l Appl. ................. 426/624 |
| WO83/00007 | 1/1983 | PCT Int'l Appl. ................. 426/624 |
| 195911 | 3/1923 | United Kingdom ............... 426/624 |
| 1153706 | 5/1969 | United Kingdom . |

Primary Examiner—R. B. Penland
Attorney, Agent, or Firm—Davis Hoxie Faithfull & Hapgood

[57] ABSTRACT

A high quality animal feed stuff is produced by thermal dewatering of liquid stillage obtained from fermentation of grain raw material and distillation of the fermentation product. The liquid stillage is mixed with particles of already dewatered product and the mixture is granulated in a granulation device to form essentially spherical granules with a dry substance content of 50-70% by weight, the major part of the granules having a particle diameter in the range of 2-6 mm, whereafter the granules are dried by being conveyed as a porous bed in a controlled path in contact with hot gas of a temperature less than 100° C., and whereafter a part of the dried granules with a desired particle size are discharged and the remaining part of the granules after possible disintegration are recirculated to the granulation step. Since all the dewatering is carried out by drying with a gas of low temperature, waste heat of low value such as condensation heat from air cooled condensors (22) in the distillation plant can be used for drying the granules.

7 Claims, 1 Drawing Figure

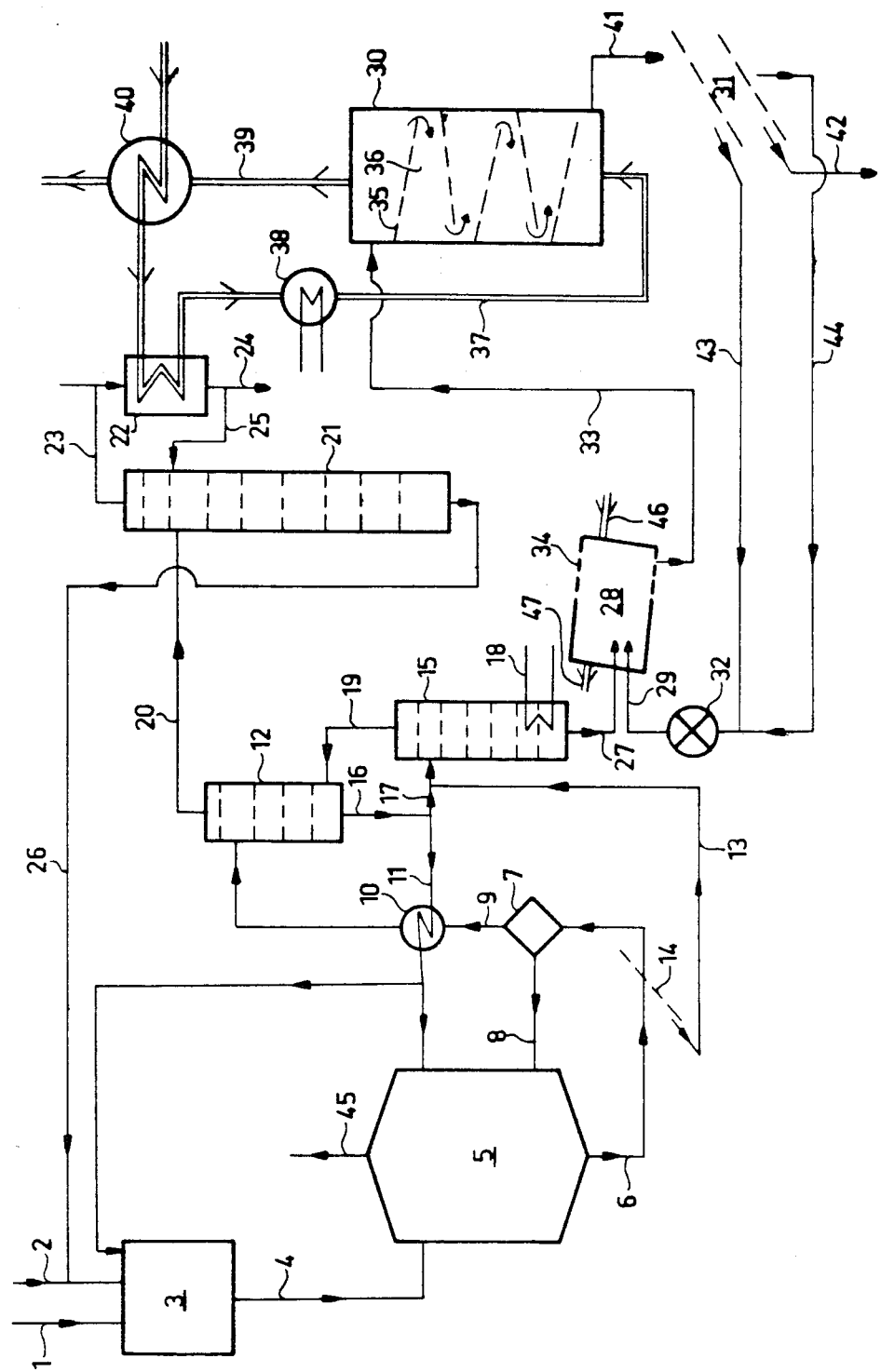

PROCESS FOR THE PRODUCTION OF ANIMAL FEED STUFF FROM A LIQUID RESIDUE OBTAINED BY FERMENTATION AND DISTILLATION OF GRAIN RAW MATERIAL

It is known that fermentation of various carbohydrate materials and distillative separation of volatile products such as ethanol provides distillation residues which have considerable nutrition value and can be used for the preparation of animal feed. Ethanol fermentation of grain, for example, can provide stillage having a protein content of about 30% of the total dry substance content. However, due to the low dry substance content, in the range of about 3–10%, of the stillage obtained in conventional batch fermentation, the further processing of the stillage to dried feed has not been very economical, though nevertheless it is often carried out to avoid the environmental problems associated with the waste disposal.

Thus, methods for concentrating the stillage from distilleries for the production of animal feed are well known. In a common process solid components of the stillage are first separated by mechanical means, after which the effluent is subjected to a power consuming evaporation to a predetermined dry substance content to allow economical drying of the product in conventional dryers such as direct heated drum dryers indirectly or disc dryers heated by steam.

New continuous fermentation processes as for example those disclosed in the Swedish patent applications Nos. 7801133-5 and 7901738-0 have made possible a reduced process water input and an output of a stillage with a dry substance content in the range of 20–35%. The costs for further processing of such a stillage to animal feed stuff are therefore considerably reduced and the stillage has become a valuable by-product of the fermentation process. The value of the stillage to the economy of the total fermentation process depends mainly on the feed stuff quality and the energy cost for dewatering the stillage.

To convert the stillage obtained in said continuous fermentation processes, which is still a viscous liquor, to such a form that it can be dried in an economical way in e.g. a drum dryer, a further evaporation to a dry substance content in the range of 30–50% should be carried out. In drying in drum dryers or disc dryers, where the material either is contacted with gas at 200°–800° C. or with heating surfaces in the range of 150°–200° C., some degradation of substances important to the nutrition value can not be avoided, unless the drying is carried out under vacuum. Vacuum drying, however, constitutes an expensive alternative. Another extremely careful and also extremely expensive drying method is freeze drying under vacuum.

Among further drying methods, which are suitable for drying liquid products, spray drying should be mentioned. At spray drying the product is subjected to contact with air of high temperature (150°–300° C.), but due to extremely short residence times, a comparatively good product quality can be achieved. The disadvantage of the method is, that it is very expensive.

A rather new method to dry and simultaneously granulate a liquid product is so called spray granulation in a fluidized bed. According to this method the liquid product to be dried is sprayed over already granulated particles being maintained in fluidized state by means of a gaseous heating medium. Such processes are for example disclosed in the German published patent specifications Nos. 2 231 445 and 3 007 292. One disadvantage of this method is that the fluidization requires large drying gas volume flows, which cannot be freely selected. Further, since the product during the entire drying procedure is constituted by dried granules, which from time to time randomly absorb fine droplets, the granules have the temperature of the drying medium during practically the entire residence time in the fluidization chamber. If a careful drying is to be obtained by this method, a combination of low drying gas temperature and a very large apparatus volume blower capacity is unavoidable. Moreover, substantially complete backmixing of the material to be dried prevails in the fluidized bed, and consequently the residence time distribution for the processed material cannot be controlled, except for batch processing.

The object of the present invention is to achieve a method for the preparation of an animal feed of high quality through careful dewatering of a liquid residue from the fermentation and distillation of grain raw material.

This object has been reached through process, which is mainly characterized in that the liquid residue together with particles of recirculated dewatered product is subjected to granulation in a granulation device to form essentially spherical wet granules with a dry substance content of 50–70% by weight, a major part of the granules having a particle diameter in the range of 2–6 mm, after which the wet granules are dried by being conveyed as a porous bed in a controlled course in contact with a drying gas having a temperature not exceeding 100° C. and a flow velocity less than the minimum velocity for fluidizing the granules, whereafter a part of the dried granules is discharged and the remaining part, after possible disintegration is recirculated to constitute and recirculated dewatered product.

According to the invention granules of a relatively uniform size are first prepared from the liquid stillage and stillage which has been dewatered. It has surprisingly been found that these wet stillage granules having a dry substance content as low as 50–70% by weight have sufficient mechanical strength to form a porous bed which can be conveyed in a controlled path, the bed being simultaneously contacted by drying air of a velocity that can be selected freely, but being less than the minimum velocity for fluidizing the granules.

For ordinary feed granules having a particle size in the range of 2–6 mm, the minimum of the drying air is in the range of 0.8–1.0 nm$^3$/m$^2$/sec. with respect to the gas velocity through empty section. The controlled drying time and granule size make possible a considerably more careful drying than e.g. fluidization in that the granules during at least the major part of the drying period gradually emit their water content so that the temperature of the drying material will be equivalent to the so-called temperature of the wet thermometer, i.e. essentially lower than the temperature of the ambient drying gas.

Apart from the fact that a feed of high nitritional value is obtained by the method according to the invention by dewatering liquid raw material, finished granules for commercial distribution are also directly obtained. Thus, those handling problems associated with feed products in powder form and those additional costs normally required for converting a feed to commercial form through pelletizing are eliminated.

The introductory granulation stop can be carried out by means of any suitable granulation device. According to one embodiment of the invention, a drum granulator is used comprising a rotary drum with its shaft of rotation slightly declining from the horizontal direction. The liquid raw material and the recirculated dried particles are fed into the upper end of the drum, optionally, after a mixing operation in a mixer, and the granules are discharged at the lower end of the drum. Any large granules which may be formed, the large mass/surface ratio of which might cause deficient drying in the succeeding drying step, are separated by screen means and returned to the granulation drum. The screen can be included in the drum itself, so that only granules of a certain maximum particle size can leave the drum.

An other example of granulation device is an extruder device, provided with nozzle openings corresponding to the desired particle diameter and cutting means that cut the extruded strings in pellets of a length corresponding to essentially spherical particles.

The granule drying is carried out in any drying device, in which the material to be dried is conveyed in a predetermined path, and thus maintained for a controlled residence time in contact with warm air having a velocity less than the minimum velocity for fluidizing the granules.

Examples of such drying plants are plate dryers, conveyor screen dryers and shaft dryers.

Since in the method according to the invention the drying is carried out by means of air at a relatively low temperature, waste heat of low value can be utilized. If the drying air available has a particularly low temperature or if such a low temperature is desired for achieving an extreme high product quality, rather long residence times can be required. In such cases shaft drying is usually more economical than conveyor screen dryers or plate dryers. Since the wet granules before the drying procedure often do not have sufficient mechanical strength to be fed directly into a shaft dryer, the granules according to a preferred embodiment of the invention can be pre-dried in a conveyor dryer or a plate dryer and then dried to finished product in a shaft dryer.

Since the method according to the invention implies drying with a gas of a temperature less than 100° C., preferably no more than 80° C. and most preferably not more than 70° C., for the drying step, waste heat of low value can be provided from an integrated plant for fermentation and distillation recovery of fermentation product and simultaneous preparation of animal feed from the stillage.

According to a preferred embodiment of the invention the condensation heat obtained by condensing vapours from one or several of the distillation columns of the plant is utilized for heating the drying air. The condensation is carried out in air cooled heat exchangers, and the air used as cooling medium in the condenser, with, optionally, some further heating, is used in a dryer for drying the granules. After further heat exchange between the air leaving the dryer and the air fed to the air cooled condenser, said heat of condensation can be utilized as the major part of the total drying energy required.

The invention will now be further described by means of the following examples, wherein reference is made to the accompanying drawing, which shows a flow chart of a continuous ethanol fermentation and distillation plant according to the Swedish patent application No. 7901738-0, and stillage processing according to the present invention.

Referring to the drawing from a fermentor 5 a liquid stream 6 is withdrawn and separated by means of a centrifugal separator 7 into a first one stream 8 enriched in yeast, which is recirculated to the fermentor, and a substantially yeast free stream 9, which after heat exchange in exchange 10 with recirculated stillage 11 is fed to a distillation unit 12. Before the stream 6 is fed to the centrifugal separator 7, solid material 13 from the fermentation liquor is separated by means of a sieve device 14 and sent directly to a stripper column 15. Of a major part 11 of the bottom stream 16 from the distillation unit 12 is recirculated to the fermentor 5 and/or the saccharifying step 3, while the remaining minor part 17 is fed to the stripping column 15, which is heated by indirect steam 18. The vapours 19 from the stripper 15 are fed to the distillation unit 12 as heating medium. A vapour stream 20 from the distillation unit 12 is sent to a rectifying column 21 provided with an air cooled condenser 22 for condensation of a vapour stream 23 from the rectifying column 21. A part 24 of the ethanol condensed in the condenser 22 is discharged while the remaining part is recirculated to the column 21 as reflux 25. From the bottom of the rectifying column at 26 so-called still water is discharged, which is recirculated as process water to the saccharifying step 3.

From the bottom of the stripper 15 is continuously discharged a stillage stream 27, which is fed to a granulation drum 28. To the drum is also fed dried particles 29, recirculated from a drying plant 30, a sieve device 31 and a mill 32. Through the granulation drum 28 is also sent an air stream 46, 47.

Granules 33, a major part of which having a particle diameter in the range of 2–6 mm and a dry substance content of 50–70% by weight, are continuously discharged from the lower end of the drum 28, in which a sieve device 34 is provided to retain particles above a certain size. The granule stream 33 is fed to the dryer 30, comprising a number of plates 35 located above one another and sloping in the transport direction of the granules. These plates are provided with perforations 36 for passage of drying gas. The granules are transported in the dryer 30 along each plate 35 and from one plate to the other by means of gravity and impulses from the drying gas being passed through said perforations. Hot air from line 37 is used as the drying medium. It is heated while serving as cooling medium in the air cooled condenser 22 and further heated by an additional heating device 38. The humid air 39 leaving the dryer 30 is heat exchanged in a heat exchanger 40 with the air fed to the condenser 22.

From the bottom of the dryer 30 dried granules are discharged 41, and screened in a screening device 31. A particle fraction suitable for the end product, for example in the range of 3–5 mm, is discharged 42 and the remaining over fraction and under fraction are carried through lines 43 and 44 respectively to a mill 32 where they are milled and then fed as granulation nuclei to the granulation drum 28.

The invention will be further described by means of the following specific examples which are furnished for purposes of illustration only.

EXAMPLE 1

Continuous ethanol fermentation was carried out in the plant shown in the drawing. As raw material wheat was used, and the plant was dimensioned for fermentation of 66 kg/h wheat and an ethanol production of 20 kg/h. All flow quantities stated below refer to 1 kg produced ethanol. The following table 1 shows ingoing and outgoing product streams.

TABLE 1

| Stream No. | Product | Flow kg/kg EtOH | Water | Fermentable | Non-fermentable Solubl. | Non-sol. | Ethanol |
|---|---|---|---|---|---|---|---|
| 1 | Wheat | 3.30 | 0.50 | 1.97 | 0.33 | 0.50 | |
| 2 | Water | 1.45 | 1.45 | | | | |
| 45 | Carbon dioxide | 0.97 | | | | | |
| 42 | Feed stuff | 0.92 | 0.09 | | 0.33 | 0.50 | |
| 37 | Drying water | 1.82 | 1.82 | | | | |
| 24 | Ethanol (96%) | 1.04 | 0.04 | | | | 1.00 |

From the bottom of the stripper 12, 2.73 kg stillage with a dry substance content of 29.6% was discharged and fed to the granulator 28 together with recirculated granules of 90% DS* which has been milled in a hammer mill 32 to a granulation nucleus less than 1 mm. The ratio stillage/granulation nucleus was about 1:1, and the granules discharged from the granulator has a DS of 60%. *

* DS means dry substance.

The heat energy was supplied to the process as indirect steam at 2 atm, of which 2.75 kg was fed at 18 to the stripper column 15, and 0.88 kg was fed to the heat exchanger 38 for additional heating of the drying air. Thus, only 0.88 kg further steam was added for drying off 1.82 kg water from the granules. For comparison it is noted that the evaporation of this amount of water in a conventional dryer generally requires at least 3 kg steam.

In the dryer 135 Nm³/kg air was consumed and the following air temperatures were measured: Ingoing air of 10° C. was heat exchanged with outgoing air to 35° C., then heated in the condenser 22 to 59° C. and further heated in the heat exchanger 38 to 70° C. The air leaving the dryer 30 was at 40° C. and was discharged from the heat exchanger 40 at 25° C.

The granular fraction 42 discharged from the screen device 31 had a particle size in the range of 2.5–5 mm and a composition according to the following table 2:

TABLE 2

| Component | % b.w. |
|---|---|
| Raw protein | 31 |
| Raw fat | 9 |
| Fibres | 9 |
| Minerals (ash) | 6 |
| Glycerol | 4 |
| Carbon hydrates | 32 |
| Water | 9 |
| | 100 |

EXAMPLE 2

Conventional stillage drying is carried out for comparison.

The same stillage as used in Example 1 was dried in a rotary disc dryer and was heated by steam of 7 atm, and the water evaporated from the stillage was discharged by secondary air. In the outlet end of the dryer a dry product temperature of 110°–120° C. was measured. Outgoing secondary air had a temperature of 90°–100° C. and a relative humidity of about 60%. The dried product had a water content of 14% by weight.

EXAMPLE 3

For a comparison the same stillage as used in Example 1 was subjected to freeze drying.

EXAMPLE 4–6

A decisive feature for the quality of an animal feed stuff is its so called digestability, i.e. the part of feed stuff that is actually assimilated through the walls of the animal's intestine. A common method of estimating said digestability is the so called pepsin solubility.

The dried products obtained according to Example 1–3 was dissolved in pepsin and hydrochloric acid over 48 hours. The solution was filtered and the filtrate was analyzed with respect to its hydrogen content of the dried product. The result is stated in the following table 3:

TABLE 3

| Example No. | Drying method | Pepsin solubility % of raw protein |
|---|---|---|
| 4 | Drying acc. to the invention | 84 |
| 5 | Drying in a disc dryer | 68 |
| 6 | Freeze drying | 85 |

It can be seen from the table that the product dewatered according to the invention had not been subjected to any essential feed quality reductions.

We claim:

1. A process for producing high quality animal feed by the thermal dewatering of a liquid residue obtained by fermentation of grain and distillation of the fermentation product consisting essentially of mixing said liquid residue with recirculated pulverized dried product, granulating the mixture so obtained to form wet granules containing 50 to 70% by weight dry substance, a major part of said granules having a particle size of 2–6 mm. and drying the wet granules by conveying them as a porous bed in a controlled path, in contact with a drying gas having a temperature not greater than 100° C. whereby waste heat gas may be employed, said drying gas having a velocity less than that required for fluidizing said granules, discharging a first portion of said granules from said bed to provide a feed having improved nutritional value, disintegrating a second portion of said granules from said bed and recirculating said disintegrated portion to said initial mixing step.

2. The process of claim 1, wherein said mixing and said granulation are carried out simultaneously by continuously feeding said liquid residue and said recirculated pulverized dried product to a rotary granulation drum, and, continuously discharging the wet granules so formed from the granulation drum and drying the wet granules in a separate drying step.

3. The process of claim 1, further comprising mixing the liquid residue with recirculated pulverized dried product, extruding the mixture so obtained through openings of a diameter in the range of 2–6 mm., cutting the extruded strings to granules of uniform size, and drying the granules in a separate drying step.

4. The process of claim 1, further comprising screening the granules after being dried into particle fractions, discharging granules having a size within a range suitable for feed stuff granules and recirculating particles of sizes above and below said range.

5. The process of claim 1, wherein the wet granules are dried by passing them as a moving porous bed along a surface provided with perforations for passage of drying gas.

6. The process of claim 1, wherein the wet granules are dried while being conveyed as a porous bed on a moving support provided with perforations for passage of drying gas.

7. The process of claim 1, wherein the granules are first dried while being conveyed as a thin porous bed in a first drying step and are then dried to a finished product by being passed as a porous shaft by means of gravity through a drying shaft.

* * * * *